J. F. O'CONNOR.
FRICTION SHOCK ABSORBING MECHANISM.
APPLICATION FILED JUNE 13, 1921.
1,421,822. Patented July 4, 1922.
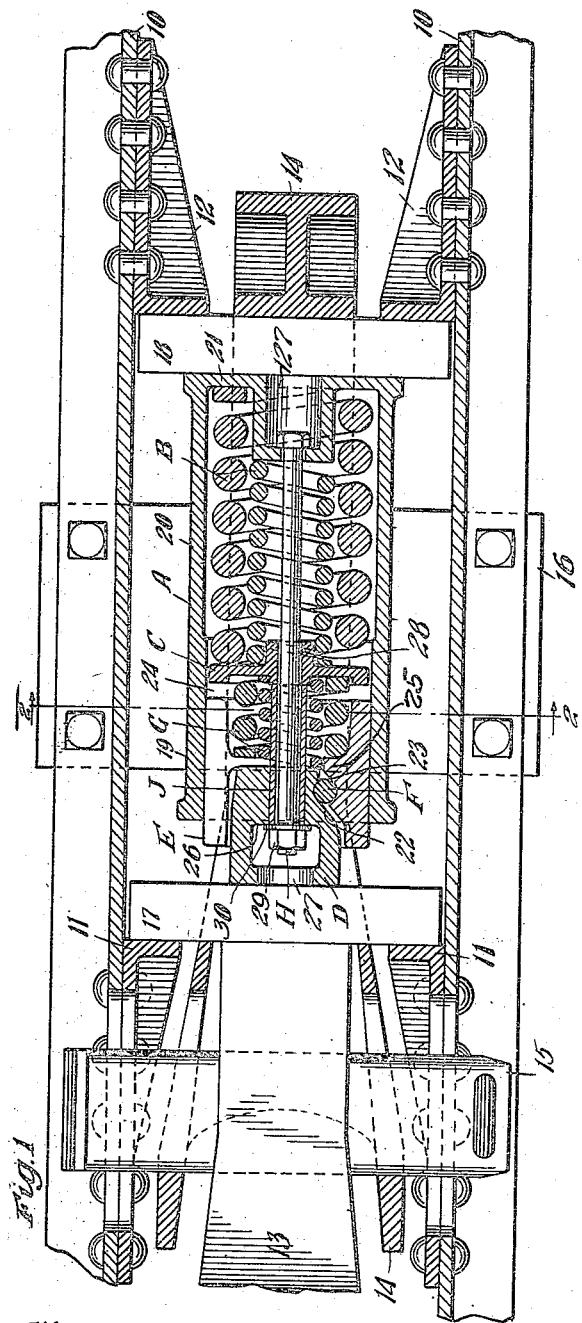
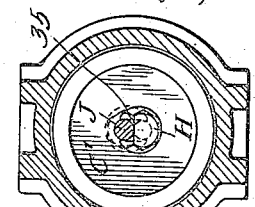
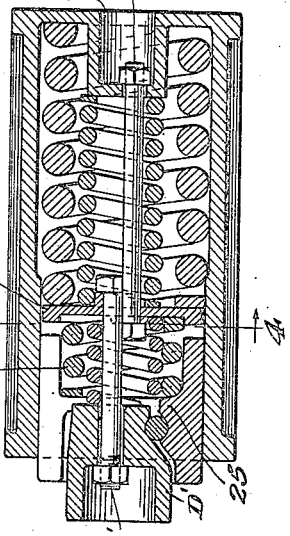
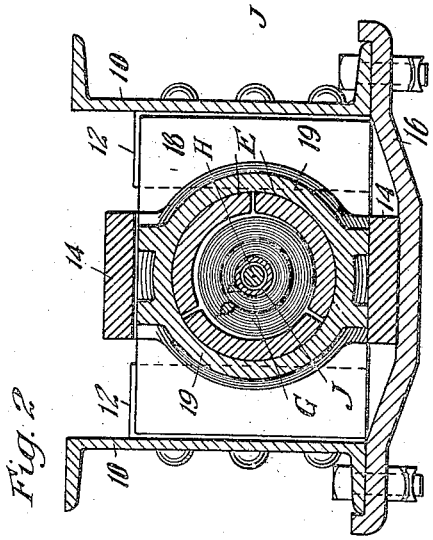
Witnesses
Wm. Geiger
Inventor
John F. O'Connor
By Geo. I. Haight
His Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,421,822.      Specification of Letters Patent.      Patented July 4, 1922.

Application filed June 13, 1921. Serial No. 476,988.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

In the art of railway draft riggings, certain railroads desire that the friction draft gears have a preliminary action of a relatively light cushioning capacity prior to the bringing into play of the full shock absorbing capacity of the mechanism. With certain types of friction mechanisms involving shells of peculiar formation, it is a comparatively simple matter to employ a follower between the main spring resistance of the mechanism and the friction elements with a preliminary spring between said follower and the friction elements which preliminary spring comes into play before the main spring resistance is compressed. With these types of gears the overall length can be obtained by having the spring follower engage a shoulder in the peculiarly shaped shell and then extend a bolt from the follower through the friction elements to impose the desired initial compression on the preliminary spring.

With certain other types of friction shells and particularly a shell which is of cylindrical form from end to end where there are no shoulders available for a spring follower to bear against therewithin, it has heretofore been deemed necessary to employ a preliminary spring outside of the friction shell proper to obtain the desired preliminary action and also maintain the proper overall length. Obviously this involves additional parts and some special means for enclosing or housing the outside preliminary spring to maintain it in properly assembled relation with the friction shell and other parts directly cooperable with the shell.

The object of my invention is to provide a preliminary action in a friction shock absorbing mechanism employing a shell which does not afford any inner shoulders for a spring follower to bear against and at the same time have all of the parts, including the preliminary spring, disposed entirely within such shell and also provide the necessary means for maintaining the overall length of the mechanism and for imposing the desired initial compression on the preliminary spring.

More specifically the object of my invention is to provide a preliminary light cushioning action in a friction draft gear having a cylindrical shell wherein all of the parts are confined within the shell.

In the drawing forming a part of this specification Figure 1 is a horizontal longitudinal sectional view of a portion of a railway draft rigging showing my improvements therein. Figure 2 is a transverse vertical sectional view corresponding substantially to the line 2—2 of Fig. 1. Fig. 3 is a view similar to Fig. 1 but illustrating the friction shock absorbing mechanism proper only and embodying a different form of my invention and Fig. 4 is a vertical sectional view corresponding substantially to the line 4—4 of Fig. 3.

Referring first to the construction illustrated in Figs. 1 and 2, 10—10 denote draft sills of a railway car to the inner faces of which are secured front stop lugs 11 and rear stop lugs 12. A portion of a draw bar is indicated at 13 the same being operatively associated with the shock absorbing mechanism proper by a hooded cast yoke 14 and coupler key 15. The yoke and parts therewithin are supported in operative position by a detachable saddle plate 16.

The improved shock absorbing mechanism as shown, is interposed between ordinary front and rear main followers 17 and 18. The mechanism itself comprises, broadly, a combined friction shell and spring cage A; a main spring resistance B; a spring follower C; a wedge D; a circularly arranged series of friction shoes E—E; anti-friction rollers F—F between the wedge and shoes; a preliminary spring G; a retainer bolt H; and a spacing sleeve or bushing J.

The casting A is of cylindrical form and similar to a well known commercial type of so-called Miner friction gear. The cylindrical friction shell proper 19 is formed at the forward end of the casting and rearwardly thereof the casting is formed with a cylindrical spring cage 20 having an integral rear wall 21. In this construction, it is obvious that there are no shoulders formed on the interior of the casting and it is impractical to provide such shoulders for the reason that all of the space is required for the main spring and friction elements and follower C in moving back and forth without interference.

The wedge D is of triangular formation having three wedge faces 22 each opposed to a corresponding wedge face 23 on a friction shoe E. The anti-friction rollers F are three in number and each is interposed between a pair of wedge faces 22 and 23 in a well known manner.

The spring follower C is of circular or disc-like form and the main spring B, at its forward end bears against the inner side of said follower C as clearly shown in Fig. 1. The follower C is normally spaced a short distance from the inner ends of the shoes E as indicated at 24.

The prelimenary spring G bears at its rear end against the follower C and at its forward end against radially inwardly extended shoulders 25—25 formed on shoes E. Both of the springs B and G are preferably of the two-coil type as illustrated in Fig. 1.

The hollow cylindrical bushing or sleeve J extends through a suitable opening in wedge D and bears at its rear end against the central hub or boss of the follower C. At its forward end, the bushing or sleeve J will normally terminate flush with the surface 26 on the interior of the wedge D, which surface 26 is obtained by suitably coring the wedge D and leaving it accessible through the opening 27.

The retainer bolt H is suitably anchored at its rear end within a hollow boss 127 formed integral with the wall 21 in a well known manner. The shank of the bolt H extends axially through the spring B, through a suitable aperture 28 in follower C and through the hollow sleeve J. A nut 29 and washer 30 are applied to the bolt within the wedge D as shown.

From the preceding description, it will be seen that the overall length of the mechanism may be properly maintained by the bolt H. It will also be seen that the sleeve J serves to positively space the follower C from the ends of the shoes E, in normal position of the parts, and said spacing 24 will always be uniform regardless of the degree to which the nut 29 is turned down on the bolt H or, stated in another manner, will always be constant regardless of the overall length of the mechanism. In this connection it will be understood that the capacity of the spring B is appreciably greater than that of the prelimenary spring G, and therefore, by using the proper length of sleeve J, the desired initial compression on the preliminary spring G may be regulated. In operation, assuming a buffing movement the wedge and shoes will be forced inwardly toward the follower C which will remain substantially stationary until the spring G has been compressed and the space 24 eliminated. This provides the easy initial action desired by certain users without bringing the main spring into play. After the preliminary action above described, the shoes E engage the follower C and thereafter the action is the same as in prior well known types of draft gears with the main spring affording the resistance to the movement of the shoes with respect to the shell.

In the construction illustrated in Figures 3 and 4, the arrangement of shell, main spring, spring follower, shoes, wedge, anti-friction rollers and preliminary spring is the same as that shown in Figures 1 and 2. In lieu of the retainer bolt H and sleeve J, the construction shown in Figures 3 and 4 employees two bolts H' and J'. The bolt H' preferably has the head thereof bearing against the outer side of the spring follower C' and nut applied to the opposite end within the hollow boss 227. By means of this bolt, it is evident that the position of the follower C' within and with respect to the friction shell can be positively regulated. The other shorter bolt J' has the head thereof bearing against the inner side of the follower C'; and the nut applied within the wedge D'. By means of the bolt J' it is evident that the spacing between the friction shoes and follower C' and the degree of compression on the preliminary spring G' can be regulated as desired. Due to the fact that the two bolts H' and J' overlap each other to a certain extent the same are offset as best indicated in Fig. 4 and the heads of the bolts will be suitably cut away on one side as indicated at 35 in Fig. 4 so as to allow the shanks of the two bolts to lie in contact. The operation of the construction shown in Figs. 3 and 4 is the same as that previously described in relation to the construction shown in Figs. 1 and 2.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a casting having a friction shell and spring cage formed integrally, the interior of said shell and cage being free from stop shoulders; of a main spring resistance within said cage; a plurality of friction elements within and cooperable with said friction shell and including an element adapted to receive the actuating pressure; a spring follower within said casting located between said friction elements and main spring resistance and against which one end of said main springs bears, said follower being longitudinally freely movable within said casting; a preliminary spring resistance interposed between said friction elements and said spring follower; and means for maintaining a predetermined normal relation between said friction elements and spring follower and initial compression upon the preliminary spring and also for maintaining the overall length of the mechanism.

2. In a friction shock absorbing mechanism, the combination with a casting having a friction shell and spring cage formed integrally, the interior of said shell and cage being free from stop shoulders; of a main spring resistance within said cage; a plurality of friction elements within and cooperable with said friction shell and including an element adapted to receive the actuating pressure; a spring follower within said casting located between said friction elements and main spring resistance and against which one end of said main springs bears, said follower being longitudinally freely movable within said casting, a preliminary spring resistance interposed between said friction elements and said spring follower; and means for maintaining a predetermined normal relation between said friction elements and spring follower and initial compression upon the preliminary spring and also for maintaining the overall length of the mechanism, said means including a retainer bolt anchored at one end to said casting and an element extending from said spring follower to said pressure receiving element.

3. In a friction shock absorbing mechanism, the combination with a casting having a friction shell and spring cage formed integrally, the interior of said shell and cage being free from stop shoulders; of a main spring resistance within said cage; a plurality of friction elements within and cooperable with said friction shell and including an element adapted to receive the actuating pressure; a spring follower within said casting located between said friction elements and main spring resistance and against which one end of said main springs bears, said follower being longitudinally freely movable within said casting; a preliminary spring resistance interposed between said friction elements and said spring follower; and means for maintaining a predetermined normal relation between said friction elements and spring follower and initial compression upon the preliminary spring and also for maintaining the overall length of the mechanism, said means comprising a bolt anchored at one end to said casting and at its other end to said pressure receiving element and a spacing sleeve extending between said element and the spring follower.

4. In a friction shock absorbing mechanism, the combination with a casting having integrally formed friction shell and spring cage sections each provided with cylindrical interior surfaces; of a main spring resistance within said cage; a wedge and a cooperating series of circularly arranged friction shoes within said shell; a spring follower within said casting located between said main spring resistance and the shoes and normally spaced from the latter, said spring follower being freely movable lengthwise within said shell and cage; a preliminary spring resistance interposed between said follower and the shoes; and means for maintaining a predetermined normal relation between said friction shoes and spring follower and an initial compression upon the preliminary spring and also for maintaining the overall length of the mechanism.

5. In a friction shock absorbing mechanism, the combination with a casting having integrally formed friction shell and spring cage sections each provided with cylindrical interior surfaces; of a main spring resistance within said cage; a wedge and a cooperating series of circularly arranged friction shoes within said shell; a spring follower within said casting located between said main spring resistance and the shoes and normally spaced from the latter, said spring follower being freely movable lengthwise within said shell and cage; a preliminary spring resistance interposed between said follower and the shoes; and means for maintaining a predetermined normal relation between said friction shoes and spring follower and an initial compression upon the preliminary spring and also for maintaining the overall length of the mechanism, said means including a retainer bolt anchored at one end to said casting and an element extending from said spring follower to said wedge.

6. In a friction shock absorbing mechanism, the combination with a casting having integrally formed friction shell and spring cage sections each provided with cylindrical interior surfaces; of a main spring resistance within said cage; a wedge and a cooperating series of circularly arranged friction shoes within said shell; a spring follower within said casting located between said main spring resistance and the shoes and normally spaced from the latter, said spring follower being freely movable lengthwise within said shell and cage; a preliminary spring resistance interposed between said follower and the shoes; and means for maintaining a predetermined normal relation between said friction shoes and spring follower and an initial compression upon the preliminary spring and also for maintaining the overall length of the mechanism, said means comprising a retainer bolt anchored at one end to said casting and at its other end to said wedge and a spacing sleeve extending between said wedge and spring follower.

In witness that I claim the foregoing I have hereunto subscribed my name this 1st day of June, 1921.

JOHN F. O'CONNOR.

Witnesses:
 CARRIE GAILING,
 ANN BAKER.